United States Patent
Kirk et al.

(10) Patent No.: US 10,467,228 B2
(45) Date of Patent: Nov. 5, 2019

(54) ACCELERATING DATABASE QUERIES USING EQUIVALENCE UNION ENUMERATION

(71) Applicant: Sybase, Inc., Dublin, CA (US)

(72) Inventors: Steven Kirk, Chelmsford, MA (US); Roland McKenney, Burlington, MA (US); David Walrath, Stow, MA (US)

(73) Assignee: Sybase, Inc., Dublin, CA (US)

(*) Notice: Subject to any disclaimer, the term of this patent is extended or adjusted under 35 U.S.C. 154(b) by 332 days.

(21) Appl. No.: 14/823,989

(22) Filed: Aug. 11, 2015

(65) Prior Publication Data

US 2017/0046386 A1 Feb. 16, 2017

(51) Int. Cl.
*G06F 7/00* (2006.01)
*G06F 16/2453* (2019.01)
*G06F 16/2455* (2019.01)

(52) U.S. Cl.
CPC .. *G06F 16/24542* (2019.01); *G06F 16/24568* (2019.01)

(58) Field of Classification Search
CPC ............... G06F 17/30023; G06F 16/24542
See application file for complete search history.

(56) References Cited

U.S. PATENT DOCUMENTS

| | | | |
|---|---|---|---|
| 5,548,770 A | 8/1996 | Bridges | |
| 5,742,806 A | 4/1998 | Reiner et al. | |
| 5,761,564 A | 6/1998 | Piccinino, Jr. | |
| 5,838,965 A | 11/1998 | Kavanagh et al. | |
| 6,377,943 B1 | 4/2002 | Jakobsson | |
| 6,460,043 B1 | 10/2002 | Tabbara et al. | |
| 6,694,322 B2 | 2/2004 | Warren et al. | |
| 6,785,673 B1 | 8/2004 | Fernandez et al. | |
| 6,823,329 B2 | 11/2004 | Kirk et al. | |
| 6,862,602 B2 | 3/2005 | Guha | |
| 6,910,044 B2 | 6/2005 | Weinberg et al. | |
| 7,171,352 B2 | 1/2007 | Chang et al. | |
| 7,440,957 B1 | 10/2008 | Kotidis et al. | |
| 7,516,121 B2 | 4/2009 | Liu et al. | |
| 7,672,925 B2 | 3/2010 | Kirk et al. | |
| 8,321,429 B2 | 11/2012 | Kirk et al. | |

(Continued)

*Primary Examiner* — Ajith Jacob
(74) *Attorney, Agent, or Firm* — Mintz Levin Cohn Ferris Glovsky and Popeo, P.C.

(57) ABSTRACT

A database query may include an operator requesting two or more incoming tuple streams be combined into a result tuple stream. Generating a query execution plan may include constructing an equivalence union enumeration lookup table for a result domain of an element within the result tuple stream by taking a set union of incoming tuple domains, wherein each distinct value within that result domain is assigned an enumeration value. Generating the query execution plan may include constructing a secondary enumeration for each incoming tuple stream, wherein each secondary enumeration maps enumerated values within the incoming tuple stream into secondary ordinal values that correspond to equivalence union enumeration values. Generating the query execution plan may include mapping an incoming enumeration value through the secondary enumeration to produce an equivalence union enumeration value, and/or mapping, with the equivalence union enumeration lookup table, the equivalence union enumeration value to a cell value.

20 Claims, 6 Drawing Sheets

(56) References Cited

U.S. PATENT DOCUMENTS

| | | |
|---|---|---|
| 2002/0093522 A1 | 7/2002 | Koskas |
| 2002/0095421 A1 | 7/2002 | Koskas |
| 2003/0187858 A1 | 10/2003 | Kirk et al. |
| 2003/0225779 A1 | 12/2003 | Matsuda |
| 2004/0054683 A1 | 3/2004 | Nishizawa et al. |
| 2005/0149472 A1 | 7/2005 | Schreter |
| 2005/0203876 A1 | 9/2005 | Cragun et al. |
| 2006/0235818 A1 | 10/2006 | Muras |
| 2007/0203709 A1 | 8/2007 | Yasutaka |
| 2008/0027892 A1 | 1/2008 | Carnahan et al. |
| 2008/0114793 A1 | 5/2008 | Grosset et al. |
| 2008/0162414 A1 | 7/2008 | Kirk et al. |
| 2008/0222136 A1* | 9/2008 | Yates ................ G06F 17/30321 |
| 2012/0030220 A1* | 2/2012 | Edwards ........... G06F 17/30474 707/754 |

* cited by examiner

SECONDARY ENUMERATION
MAPPING FROM T3.Y TO
EQUIVALENCE UNION
ENUMERATION OF T.Y

LOOKUP TABLE FOR T3.Y — 138

| T3.Y ORDINAL | T3.Y COLUMN CELL VALUE | T.Y EQUIVALENCE UNION ENUMERATION |
|---|---|---|
| 1 | MASSACHUSETTS | 2 |
| 2 | NEW JERSEY | 6 |
| 3 | VERMONT | 4 |
| 4 | NEW YORK | 1 |
| 5 | DELAWARE | 7 |
| 6 | RHODE ISLAND | 8 |

ACCELERATING DATABASE QUERIES USING EQUIVALENCE UNION ENUMERATION

FIELD

The subject matter described herein relates to querying databases using statements containing a SQL language UNION, INTERSECT, or EXCEPT operator, or any other tuple set combining operator.

BACKGROUND

Databases are used throughout business, science, and engineering. Databases are used extensively in business enterprise resource planning ("ERP") systems, solutions, programs, and other software to assist businesses in performing various tasks. To access data stored in databases, queries are performed. The day-to-day operations of a business may include a multitude of tasks utilizing database queries such as purchasing, sales, payroll, accounting, timekeeping, benefits administration, security, maintenance, and various other tasks that businesses need to perform. Some of the databases may include trillions of records or more. Moreover, the databases may contain many different sets of data stored as separate tables within the database. Some applications may require combining multiple sets of data into a single set for subsequent processing. The capability to combine a collection of disjoint tuple sets quickly and efficiently is important to reducing both economic and computational costs of many database applications.

SUMMARY

In one aspect, a database query includes an operator requesting two or more incoming tuple streams be combined into a result tuple stream. At least one data value in the incoming tuple streams may be represented by an enumeration value. A query execution plan may be generated. Generating the query execution plan may include constructing an equivalence union enumeration lookup table for a result domain of the result tuple stream by taking a set union of incoming tuple domains, wherein each value within that result domain is assigned an enumeration value. Generating the query execution plan may further include constructing a secondary enumeration for each incoming tuple stream, wherein each secondary enumeration maps enumerated values within the incoming tuple stream into secondary ordinal values. The secondary ordinal values may correspond to equivalence union enumeration values. Generating the query execution plan may further include mapping an incoming enumeration value through the secondary enumeration to produce an equivalence union enumeration value, and/or mapping, with the equivalence union enumeration lookup table, the equivalence union enumeration value to a cell value. The query may be executed according to the query execution plan to obtain the data value. The data value in response to the database query.

In some variations, one or more of the features disclosed herein including the following features can optionally be included in any feasible combination. The operator may include one or more of a SQL language UNION operator, an INTERSECT operator, or an EXCEPT operator. Value equivalence comparisons required by a SQL language operator may be performed by comparing a plurality of equivalence union enumeration values. The equivalence union enumeration value may be represented by an integer value with a smallest size necessary to enumerate a number of data values in the lookup table. A decision to create the query execution plan may be made on the basis of estimated costs and benefits. The at least one data value in the incoming tuple streams represented by the enumeration value may include one or more of: a column represented using an enumerated storage, a secondary enumeration over a column represented using an enumerated storage, a value expression encoded using a temporary enumeration, and an equivalence union enumeration from a lower level operator. The equivalence union enumeration may be assigned enumeration values such that sorting on the cell value and sorting on the enumeration value yield the same ordering.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The subject matter disclosed herein provides numerous benefits. The equivalence union enumeration disclosed herein achieves reductions in database storage requirements, and costs associated with database storage and management. In particular, where multiple incoming tuple sets are combined to produce a composite tuple set, and where for some member of the incoming tuple sets each incoming value is either a column that was stored using enumerated storage, or a value set that could be inexpensively turned into a temporary enumeration, then the instant subject matter reduces the storage needed, speeds comparisons, and speeds access to the resulting composite tuple set, and thereby improves the performance of queries using such operations. Some aspects of temporary enumeration are described in U.S. Pat. No. 7,672,925, which is hereby incorporated by reference in its entirety. Some aspects of secondary semantic enumeration and/or secondary equivalence enumeration representations are described in U.S. Pat. No. 8,321,429, which is hereby incorporated by reference in its entirety.

DESCRIPTION OF DRAWINGS

In the drawings.

Like labels are used to refer to the same or similar items in the drawings.

DETAILED DESCRIPTION

Multiple sets of data that may need to be combined includes data that resides within different tables, for example, from a CATALOG_SALES table and a RETAIL_STORE_SALES table. The data sets may be disjoint and may be from different databases, or be from a more complex set of preceding query operations. For example, the SQL language UNION, INTERSECT, and EXCEPT operators may enable two or more such disjoint data sets (often referred to as virtual tables) to be combined, where the members of the disjoint data seta may include a tuple containing an ordered list of values. The resulting combined data set may be included in any subsequent query operations requested by a user. For example, in the SQL language, there are two variants of the UNION operator. The UNION ALL variant may unconditionally combine the incoming disjoint tuple sets into a single result tuple set (also referred to as the result virtual table). When the combining is unconditional, the result tuple set may contain two or more tuples with the same sets of values (i.e. duplicate tuples). The UNION DISTINCT variant may combine the incoming disjoint tuple sets into a single tuple set, and may eliminate the duplicate tuples, regardless of whether the duplicates came from within one of the UNION incoming tuple sets, from across the different incoming tuple sets, or both. The INTERSECT operator may combine the incoming tuple sets such that the result tuple set contains the tuples within the first incoming tuple set that may also appear in the second tuple set. The INTERSECT ALL variant may preserve duplicates within the first incoming tuple set when those tuples also appear as duplicates within the second incoming tuple set. The INTERSECT DISTINCT variant may eliminate duplicate tuples. Similarly, the EXCEPT operator may combine the incoming tuple sets such that the result tuple set contains tuples in the first incoming tuple set that are not in the second incoming tuple set, and the EXCEPT DISTINCT may eliminate duplicates from the first incoming tuple set.

To improve the performance of database queries in the real world, one approach is to consider what operations within the queries are the most expensive in terms of the time and resources consumed. An example of an expensive operation includes the creation and management of temporary data structures such as sorts and hash tables. The computational and storage costs may be influenced by at least three factors: (1) how many tuples (or records) are being stored; (2) how expensive is it to compare tuples; and (3) the size of each tuple being stored. Factor (1) may be controlled at least in part by the nature of the query and may also be controlled by the query plan selected by an optimizer.

Some example embodiments of the subject matter disclosed herein simultaneously improve query performance and reduce the tuple storage requirements. For example, query times may be reduced and/or tuple storage requirements may be reduced when a query contains a UNION ALL operator to combine sets of tuples from two or more query blocks into a single tuple stream. For illustration, Table A shows an example of Structured Query Language (SQL) code that may illustrate a reduced query time and/or a reduced tuple storage requirement.

TABLE A

SELECT T.Y, SUM(T.X)
FROM (SELECT T1.X, T1.Y FROM T1
 UNION ALL
 SELECT T2.X, T2.Y FROM T2
 UNION ALL
 SELECT T3.X, T3.Y FROM T3
) AS T(X, Y)
GROUP BY T.Y
ORDER BY SUM(T.X) DESC

Figure 1A:
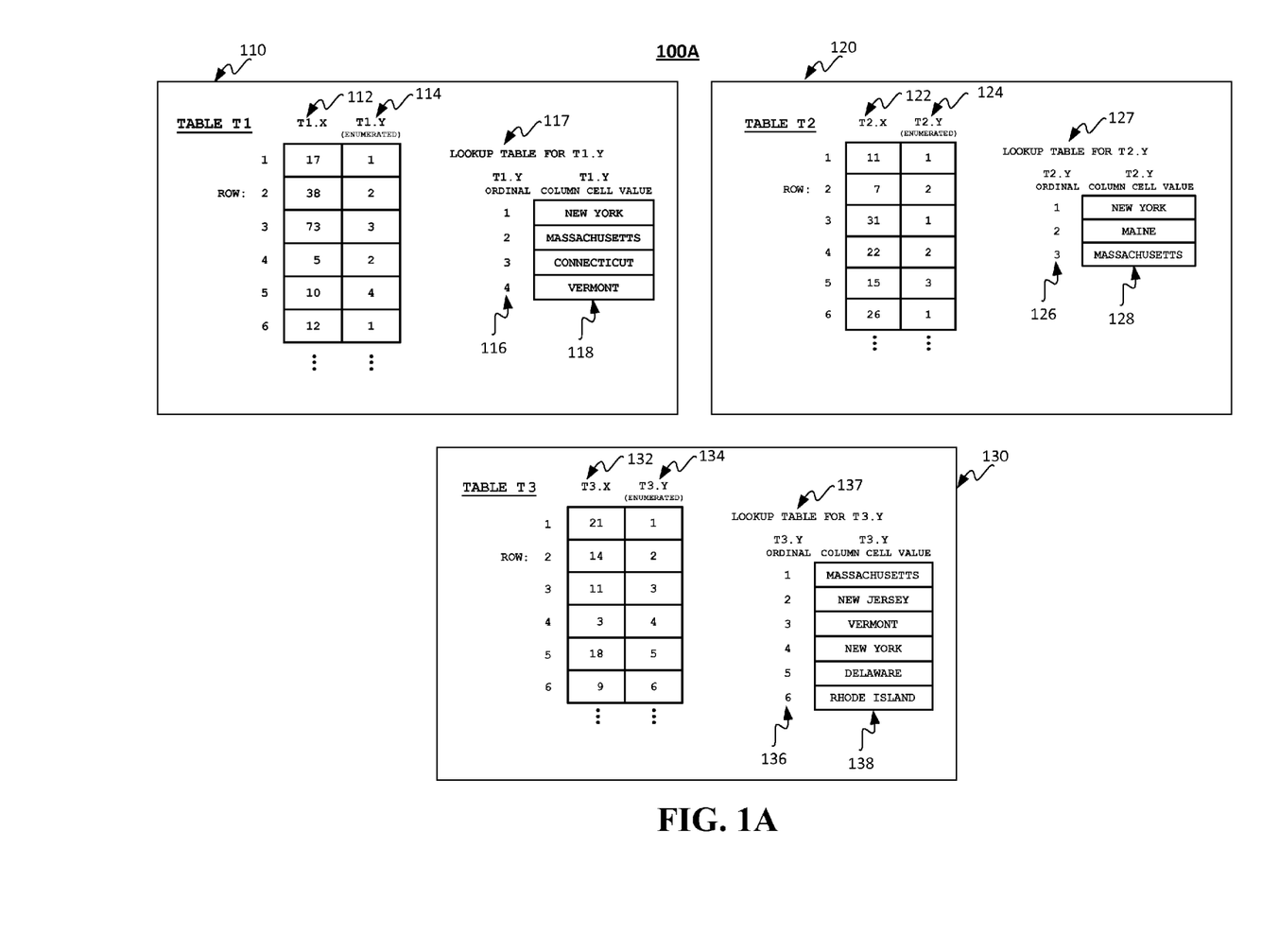
FIG. 1A depicts examples of input tables having columns with enumerated storage to illustrate equivalence union enumeration, in accordance with some example embodiments.

In the example SQL query shown in Table A, the UNION ALL operators may combine the tuple streams coming from tables such as tables T1, T2, and T3 in FIG. 1A into a single unified stream, labeled as T in Table A, where each tuple contains a pair of values of the form {T.X, T.Y}. In this example, the first element of the result tuple, T.X, may have values that come from the columns T1.X, T2.X, and T3.X, which may not be stored using enumerated storage. The second element of the result tuple, T.Y, may have values that come from the columns T1.Y, T2.Y, and T3.Y, which may be stored using enumerated storage, as shown in FIG. 1A. The UNION ALL operator unifies two or more sets of value expressions into a single value expression (e.g. the example above where the set of {T1.Y, T2.Y, T3.Y} is unified into the virtual column T.Y). The result tuples of the single unified stream may be passed upstream from the UNION ALL to other query operators, which may be the GROUP BY operator that is grouping on T.Y. In some example embodiments, instead of the actual values for column Y from the source tables T1, T2, and T3, virtual column T.Y may include enumerated representations of the actual values. By enumerating the virtual column T.Y in such a way that the values of T.Y may have a unique enumeration value, then the GROUP BY operation can be performed on the enumerated values for T.Y instead of the actual values for T.Y. Both the storage requirements and the comparison costs for that GROUP BY operator may be reduced.

In some example embodiments, a query containing two UNION ALLs, such as shown in Table A, may include three columns T1.Y, T2.Y, and T3.Y that are each stored as enumerated columns. For example, FIG. 1A shows tables T1, T2, and T3. In the example of FIG. 1A, T1 at 110 may include column T1.X with values from row 1 to 6 including 17, 38, 73, 5, 10, and 12. Table T1 may include column T1.Y with values from row 1 to 6 including 1, 2, 3, 2, 4, and 1. The values of column T1.Y may be enumerated values where the actual value corresponding to the enumerated value of 1 is "New York," the actual value corresponding to the enumerated value of 2 is "Massachusetts," the actual value corresponding to the enumerated value of 3 is "Connecticut," and the actual value corresponding to the enumerated value of 4 is "Vermont." For example, lookup table 117 depicts the mapping from the enumerated values 1-4 in T1.Y at 116 to actual values at 118. A table, such as Table T1, may include other values, and/or other numbers of columns and/or rows.

In the example of FIG. 1A, Table T2 may include column T2.X with values from row 1 to 6 including 11, 7, 31, 22, 15, and 26. Table T2 may include column T2.Y with values from row 1 to 6 including 1, 2, 1, 2, 3, and 1. The values of column T2.Y may be enumerated values where the actual value corresponding to the enumerated value of 1 is "New York," the actual value corresponding to the enumerated value of 2 is "Maine," and the actual value corresponding to the enumerated value of 3 is "Massachusetts." For example, lookup table 127 depicts the mapping from the enumerated values 1-3 in T2.Y at 126 to actual values at 128. A table, such as Table T2, may include other values, and/or other numbers of columns and/or rows.

In the example of FIG. 1A, Table T3 may include column T3.X with values from row 1 to 6 including 21, 14, 11, 3, 18, and 9. Table T3 may include column T3.Y with values from row 1 to 6 including 1, 2, 3, 4, 5, and 6. The values of column T3.Y may be enumerated values where the actual value corresponding to the enumerated value of 1 is "Massachusetts," the actual value corresponding to the enumerated value of 2 is "New Jersey," the actual value corresponding to the enumerated value of 3 is "Vermont," the actual value corresponding to the enumerated value of 4 is "New York," the actual value corresponding to the enumerated value of 5 is "Delaware," the actual value corresponding to the enumerated value of 6 is "Rhode Island." For example, lookup table 137 depicts the mapping from the enumerated values 1-6 in T3.Y at 136 to actual values at 138. A table, such as Table T3, may include other values, and/or other numbers of columns and/or rows.

In some example embodiments consistent with the instant subject matter, an equivalence union enumeration may include two components. The first component of an equivalence union enumeration may be the equivalence union enumeration lookup table which has an enumeration value for each possible value in the combined domain of values flowing into one element of the tuple for the UNION ALL. The second component of an equivalence union enumeration may be a set of secondary equivalence enumeration representations, one for each input stream flowing into the UNION ALL operator. The second component may map that stream's incoming enumeration values into the equivalence union enumeration values that represent the same cell value. During the execution phase, each enumerated tuple value may be used with the appropriate secondary enumeration for the source input stream to find the equivalence union enumeration value representing the same value, and then later when the cell value is required, that equivalence union enumeration value may be used with the equivalence union enumeration lookup table to retrieve the original cell value. Equivalence union enumeration may be simple and/or inexpensive to set up, and may be inexpensive to apply during execution. As used herein, inexpensive may refer to a reduced or low computational and/or storage cost, as well as referring to a reduced and/or reduced monetary cost to implement and administer, particularly when the number of tuples may be in the millions or more. In some example embodiments, equivalence union enumeration applies to the UNION operator, the most commonly used SQL tuple set combining operator. In some example embodiments, equivalence union enumeration applies to other SQL tuple set combining operators, for example, INTERSECT, EXCEPT, and to any other tuple set combining operator. The UNION DISTINCT operator and variants of the INTERSECT and EXCEPT operators compare tuples for equivalence and may therefore benefit from equivalence union enumeration.

In some example embodiments, an equivalence union enumeration for the example query UNION tuple element T.Y may combine the domains of the incoming enumerated values, such as columns T1.Y, T2.Y, and/or T3.Y in FIG. 1A based on the actual values in those columns by retrieving the distinct values from the lookup tables for each of those columns. For example, for T.Y in the example query, that combined domain contains the set of distinct values {"Vermont", "Rhode Island", "New York", "New Jersey", "Massachusetts", "Maine", "Delaware", "Connecticut"}. An equivalence union enumeration may be constructed by assigning an ordinal value to each distinct value within that combined domain, where the result is represented in an equivalence union enumeration lookup table. That assignment of ordinals (a.k.a. equivalence union enumeration values) to the distinct cell values in that combined domain may be arbitrary, as in the equivalence union enumeration lookup table shown in FIG. 1B item 145. Alternatively, the ordinals may be assigned in such a way that they preserve a useful property within the set of cell data values, as in the ordered equivalence union enumeration lookup table shown in FIG. 1B at 155, where the ordinals have been assigned so that sorting on the ordinal and sorting on the cell values will produce the same ordering. In some example embodiments, query operators above the union may use the equivalence union enumeration values, without requiring the corresponding cell values. In the example query, the GROUP BY operation on T.Y can be performed on the equivalence union enumeration ordinal values thereby saving both space and comparison costs, and then the ORDER BY on SUM(T.X) can carry the smaller equivalence union enumeration ordinal values for T.Y rather than the original cell values. The actual values (e.g. "New York," "Massachusetts," etc.) may not be needed in this example query until the projection of the final SELECT list results. When they are needed, the actual cell values may be found by using the equivalence union enumeration lookup table with the equivalence union enumeration ordinal value.

Figure 1B:
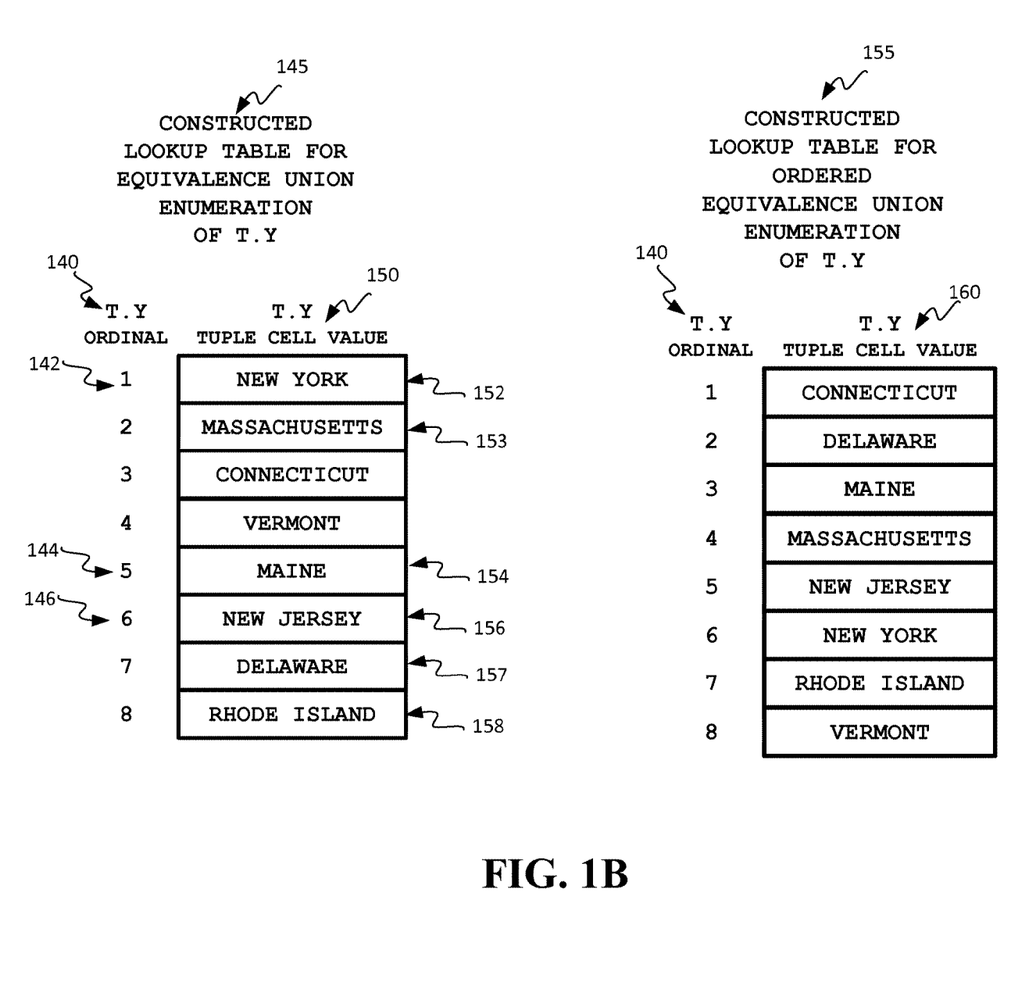
FIG. 1B depicts two alternative examples of lookup tables for equivalence union enumeration, in accordance with some example embodiments.

FIG. 1B depicts two examples of lookup tables for equivalence union enumeration, in accordance with some example embodiments. In some example embodiments, an equivalence union enumeration may be represented by an enumeration value, for example (<m>). The value (<m>) may be an equivalence union enumeration value with a tuple cell value corresponding to the <m>th tuple cell value from a combination of input tuple streams. In the example of FIG. 1A, the cell values of T1 in order from T1.X enumeration values 1 to 4 include T1.Y cell values New York, Massachusetts, Connecticut, and Vermont. The cell values of T2 in order from T2.X enumeration values 1 to 3 include T2.Y cell values New York, Maine, and Massachusetts. The cell values of T3 in order from T3.X enumeration values 1 to 6 include T3.Y cell values Massachusetts, New Jersey, Vermont, New York, Delaware, and Rhode Island.

In some example embodiments, such as the example in FIG. 1A, the values from multiple input tuples may be combined together. For example, T1.Y, T2.Y and T3.Y may be combined into a single list of cell values. In some example embodiments, the combined list may be reduced to a set of different values.

Continuing the example of FIGS. 1A and 1B, the 13 cell values when T1.Y, T2.Y, and T3.Y are combined may be reduced to 8 different values or 8 unique values. FIG. 1B at 145 depicts an example of a lookup table including enumeration ordinal values T.Y at 140, and cell values at 150. Five of the values are present in more than one of T1.Y, T2.Y, and T3.Y. In some example embodiments, the 8 different values may be put in an order corresponding to an order in which the corresponding tables are appended. For example, when T3 is appended to T2 which is appended to T1, the order of values in T.Y at 150 may correspond to the unique values of T1.Y followed by the unique values of T2.Y followed by the unique values of T3.Y. Continuing the example of FIGS. 1A and 1B, ordered in the foregoing way, the first 4 values of T.Y in FIG. 1B at 145 may correspond to the values in T1.Y. The first 4 values of T.Y correspond to ordinal values 1, 2, 3, and 4 at 140. For example, the first value in T1.Y at 118 of New York may correspond to ordinal value 1 at 142 and cell value New York at 152. The second value in T1.Y at 118 of Massachusetts may correspond to ordinal value 2 and call value Massachusetts at 154. Continuing, the third and fourth values in 118 may correspond to ordinal values 3 and 4 at 140 and cell values Connecticut and Vermont at 150.

In the example of FIGS. 1A and 1B, the lookup table at 145 may further include the cell values from T2.Y appended starting at ordinal value 5 at 144. Continuing the example, New York in T2.Y at 128 is already in T.Y at 152. Accordingly, New York may not be added again to T.Y because New York was added from T1.Y at 152. In this example, the first and only unique value in T2.Y is Maine. Maine is added to T.Y at 154. The third value in T2.Y of Massachusetts is not unique and is thus also not added again to T.Y. at 150

The cell values from T3.Y may next be appended starting at ordinal value 6 at 144. Continuing the previous example, because Massachusetts in call values 138 is already in T.Y at 153, Massachusetts may not be added again to T.Y. In this example, the first unique value in T3.Y is New Jersey at T3.Y ordinal value 3. New Jersey is added at the next ordinal value which is 6 to T.Y at 156. The third and fourth values in T3.Y of Vermont and New York are not unique and thus are not added again to T.Y at 150. In this example, the last two values of T3.Y 138 including Delaware and Rhode Island are not already contained in T.Y at 150, and are thus added to T.Y at 157 and 158. In this way, T1.Y, T2.Y, and T3.Y cell values may be combined into a list of 8 different values ordered as described above from enumeration value 1 to 8. In the foregoing example, the eight different values at 150 may include New York, Massachusetts, Connecticut, Vermont, Maine, New Jersey, Delaware, and Rhode Island. Because the maximum enumeration value in this example is eight, the maximum <m> value may be 8.

FIG. 1B at 155 depicts another example of a lookup table including enumeration ordinal values T.Y at 140, and cell values at 160. In the example of FIG. 1B at 145, the values in T.Y at 150 may be ordered according to the order in which tables T1, T2, and T3 were appended and the order of the unique values in the T1, T2, and T3. In some example embodiments the values in T.Y at 160 may be ordered differently from 145. For example, the values of T.Y at 160 may be ordered alphabetically. In some example embodiments lookup table 155 may be generated from lookup table 145 by arranging the cell values in T.Y according to a rule, such as an alphabetical rule. The ordering from low ordinal value to high ordinal value may be alphabetical from A-to-Z or as alphabetical from Z-to-A. The ordering may be determined by considering all the letters in each cell value such as shown at 160 or may be based on a limited number of characters within the cell values. The ordering may be determined by other rules as well such as an increasing or decreasing numerical order, or an order based on a date, or customer, or country, zip code, or any other ordering rule. This ordered equivalence union enumeration, which is constructed such that ordering on the cell value and ordering on the enumeration values yield the same ordering, can be used for some queries to further reduce the cost of executing the query by allowing ordering operators to be executed using the smaller and less costly to compare enumerations values rather than on the cell values.

Figure 2:
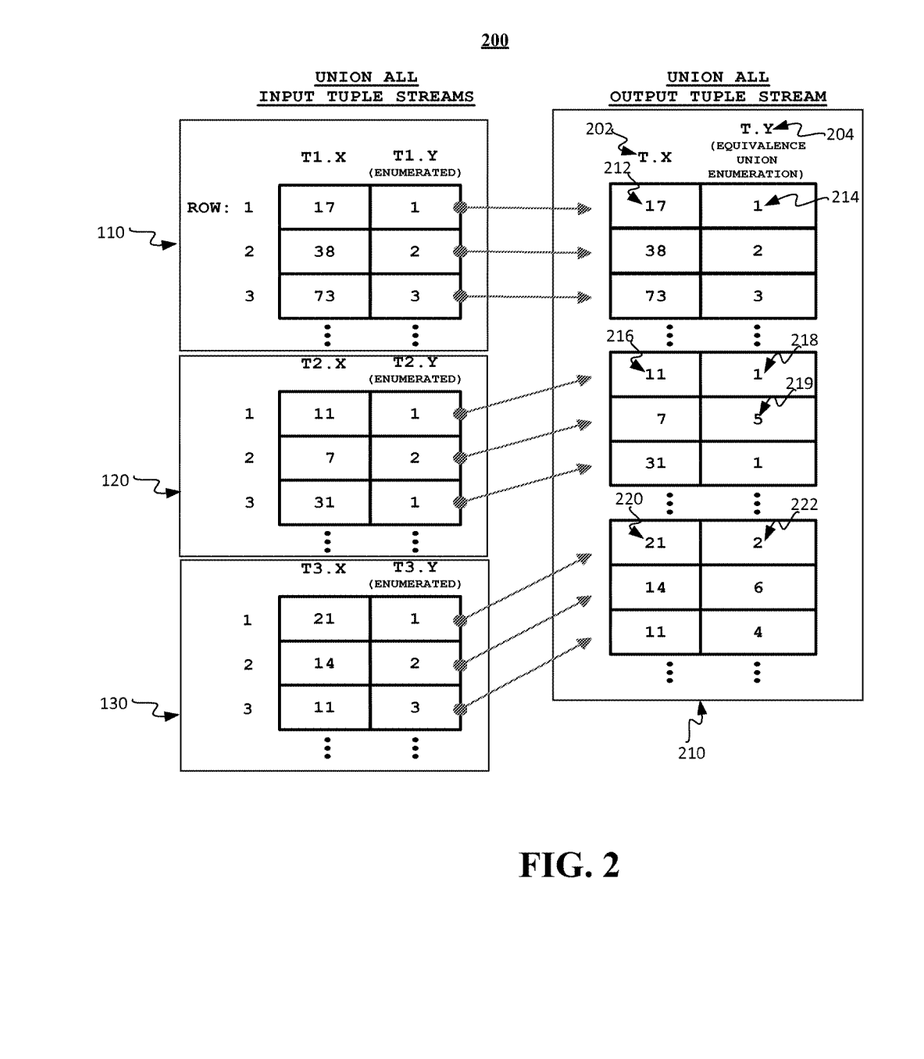
FIG. 2 depicts examples of input tuple streams and an output tuple stream created using equivalence union enumeration, in accordance with some example embodiments.

FIG. 2 depicts example input tuple streams and an example of an output tuple stream illustrating equivalence union enumeration. FIG. 2 also refers to FIGS. 1A and 1B. In the example of FIG. 2, input tuple streams 110, 120, and 130 are combined to produce output tuple stream 210. An input or output tuple stream may also be referred to as a virtual table. Input tuple stream T3.X may be appended to input tuple stream T2.X which may be appended to input tuple stream T1.X to produce a composite T.X tuple stream 202. For example, the value 17 from T1.X at row 1 may be imported into row 1 of T.X at 212 in 210. The value 38 from T1.X at row 2 may be imported into row 2 of T.X at in 210. Additional values from T1.X may also be appended to T.X. In the example of FIG. 2, appended after the last value of T1.X may be the value 11 from row 1 of T2.X at 216 in 210. Subsequent rows in T2.X may be appended after row 1. After the last row of T2.X, the value 21 from row 1 of T3.X may be appended at 220 in 210. Tuple streams T1, T2, and T3 may be combined in any other order including being interleaved together, but all tuple elements may be combined in the same order (i.e. the X and Y values in an output tuple must have come from the same input row).

Input tuple stream T3.Y may be appended to input tuple stream T2.Y which may be appended to input tuple stream T1.Y to produce an equivalence union enumeration tuple stream T.Y at 204. For example, equivalence enumeration tuple stream 204 may include values such as values 214, 218, and 222 corresponding to enumeration values from T.Y in 145 and/or 155 at 140 in FIG. 1B. Accordingly, in the example of FIG. 2, the equivalence enumeration value at 214 has value 1 corresponding to New York at 152 in lookup table 145. As described above with respect to FIG. 1B, lookup table 145 may be constructed from the different values in the input tuple streams T1, T2, T3. If instead of lookup table 145, lookup table 155 was used, the equivalence enumeration value at 214 would be 6 instead of 1. The equivalence enumeration value at 218 also has value 1 corresponding to New York at 152 in lookup table 145, or a value of 6 if lookup table 155 is used. The equivalence enumeration value at 222 has value 2 corresponding to Massachusetts at 153 in lookup table 145. If instead of lookup table 145, lookup table 155 was used, the equivalence enumeration value at 222 would be 4 instead of 2.

In some example embodiments, the storage resources needed to store the output tuple stream 210 may be affected by the number of distinct values in the equivalence union enumeration lookup table, and a cost-based decision on how best to store those enumeration values. For example, for the lookup table 145 in FIG. 1B and in the corresponding equivalence union enumeration T.Y 204 (e.g. T.Y enumerated values 0, 1, 2, 3, 4, 5, 6, 7, and 8 in FIG. 2) may be represented by a value stored in an 8-bit byte, or the input enumeration value may be represented by fewer bits. For example, an 8-bit representation of the input enumeration value may require more storage resources than a 3-bit representation. In the example of FIGS. 1A, 1B, and 2, 3-bits are sufficient to represent the 8 values in lookup tables 145 and 155.

Figure 3:
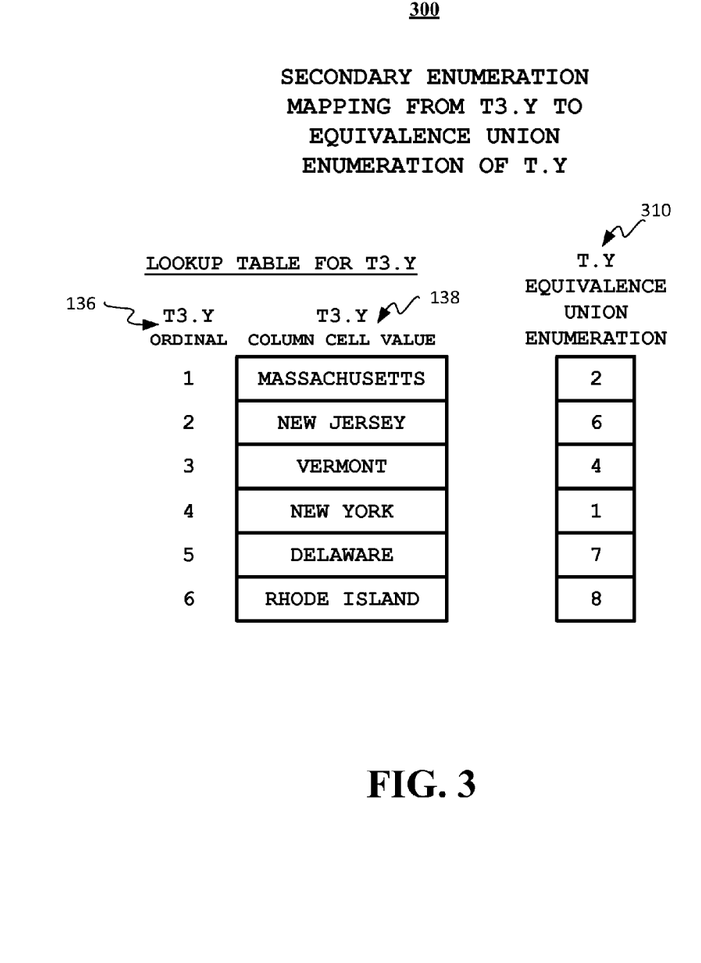
FIG. 3 depicts an example of a secondary semantic enumeration that was constructed to maps a column enumeration into the equivalence union enumeration, in accordance with some example embodiments.

FIG. 3 depicts a secondary enumeration mapping from an input tuple steam to an equivalence union enumeration, in accordance with some example embodiments. In some example embodiments, a mapping is generated between the input tuple streams such as T1, T2, and T3 to the equivalence union enumeration values such as the values in T.Y. For example, FIG. 3 shows a mapping between T3 from FIG. 1A to enumeration values in FIG. 1B at 145. Mappings between T1 and T2 to enumeration values in T.Y at 145 are not shown in FIG. 3 and may be generated by determining the T.Y equivalence enumeration values at 140 corresponding to cell values in T3.Y that match T.Y at 150. For example, a mapping table for T2 at the cell value New York has an equivalence enumeration value of 1 corresponding to New York in 145.

In some embodiments, the decision to use an equivalence union enumeration, an ordered equivalence enumeration, some other form of union enumeration, or to not use enumeration for a specific tuple element flowing out of the tuple set combining operator is based on a cost versus benefit analysis. The costs and benefits for a particular virtual column in a specific query may depend on: (a) the number of distinct values in each incoming enumeration, (b) the number of incoming tuple streams (i.e. the number of SELECT blocks being combined by UNION ALL operators), (c) the estimated total number of tuples flowing, (d) the estimated number of distinct values in the outgoing enumeration, (e) the choice of representation for the outgoing enumeration, (f) the specific type of tuple combining operator, (g) whether this tuple element is a non-primary key column from a table where the primary key column(s) are also tuple elements, (h) the estimated memory required to store the equivalence union enumeration lookup table plus the set of secondary equivalence enumerations, (i) the available memory, (j) whether there are upstream query operators that can gain a storage benefit from using a union enumerations, and/or (k) whether there are any upstream query operators that can gain a performance benefit from being able to compare equivalence union enumeration values rather than cell values.

In some example embodiments, equivalence enumeration values may be adjusted when incoming enumerations are zero-based or one-based, input source numbers are zero-based or one-based, and output equivalence union enumerations are zero-based or one-based. In the example of FIGS. 1A, 1B, 2, and 3, the input and output enumerations were one-based and the input source numbers were zero-based. These choices were based on a particular implementation. Other implementations may result in different choices. The choice of basis of the enumeration values may be influenced by, among other factors, the preferred implementation language, the reservation of the value 0 as a "null" or "not specified" value in the representation domain, the relative cost of processor time versus storage and transmission costs, and the implementation choices of external components.

In some example embodiments, source enumerations may be columns that are stored as enumerated storage. In some example embodiments, the foregoing handling of UNION ALL enumerations may be used when the input value expressions are either: (a) stored using enumerated storage, or (b) already stored as another form of enumeration. For example, a secondary enumeration or an enumeration from a lower level UNION ALL, or a temporary enumeration.

In some example embodiments, the input value expressions have the same data types. In some example embodiments, the input value expressions may include mismatched data types. For example, for a input source requiring a CAST, a cell value retrieval function may be replaced with a retrieval function that returns the result of a CAST over the original cell value by computing that CAST at most once per entry in the lookup table.

In some example embodiments, a query containing a UNION ALL operator may include one or more sets of value expressions that are unified into a single value expression (e.g. the example above where the set of {T1.Y, T2.Y, T3.Y} is unified into the virtual column (T.Y)).

In some example embodiments, each member of a unified set of value expressions may be an enumeration, or may be turned into an enumeration. For example each member may be a column with enumerated storage, a secondary enumeration over a column with enumerated storage, an expression that can be converted into a temporary enumeration (e.g. a constant, a value expression for a small number of tuples, or a value expression with a known small number of distinct values), a composite union enumeration from a lower level UNION ALL expression, and/or an equivalence union enumeration from a lower level UNION ALL expression.

In some example embodiments, an equivalence union enumeration representation may include mapping an enumeration value from any specified input source into an equivalence union enumeration value. The creation of an equivalence union inverse function may convert an equivalence union enumeration value into a cell value (or actual value).

In some example embodiments, an equivalence union enumeration created for a UNION ALL value expression replaces the value expression within the query operator tree, above the UNION ALL operator but below where that value expression's cell value is required, with the equivalence union enumeration. In some example embodiments, wherever that cell value is required, the original value expression may be replaced with the equivalence union inverse of the equivalence union enumeration representation.

In some example embodiments, the equivalence union enumeration may assigns ordinal values based on the sorted order of the set of all possible cell values. In some example embodiments, an operator above the UNION ALL operator may benefit from the ordering because the ordering may allow sorting on the ordinals rather than sorting on the cell values. In some example embodiments, the specific encoding for the equivalence union enumeration may be selected at query optimization time based on estimated run-time costs.

Figure 4:
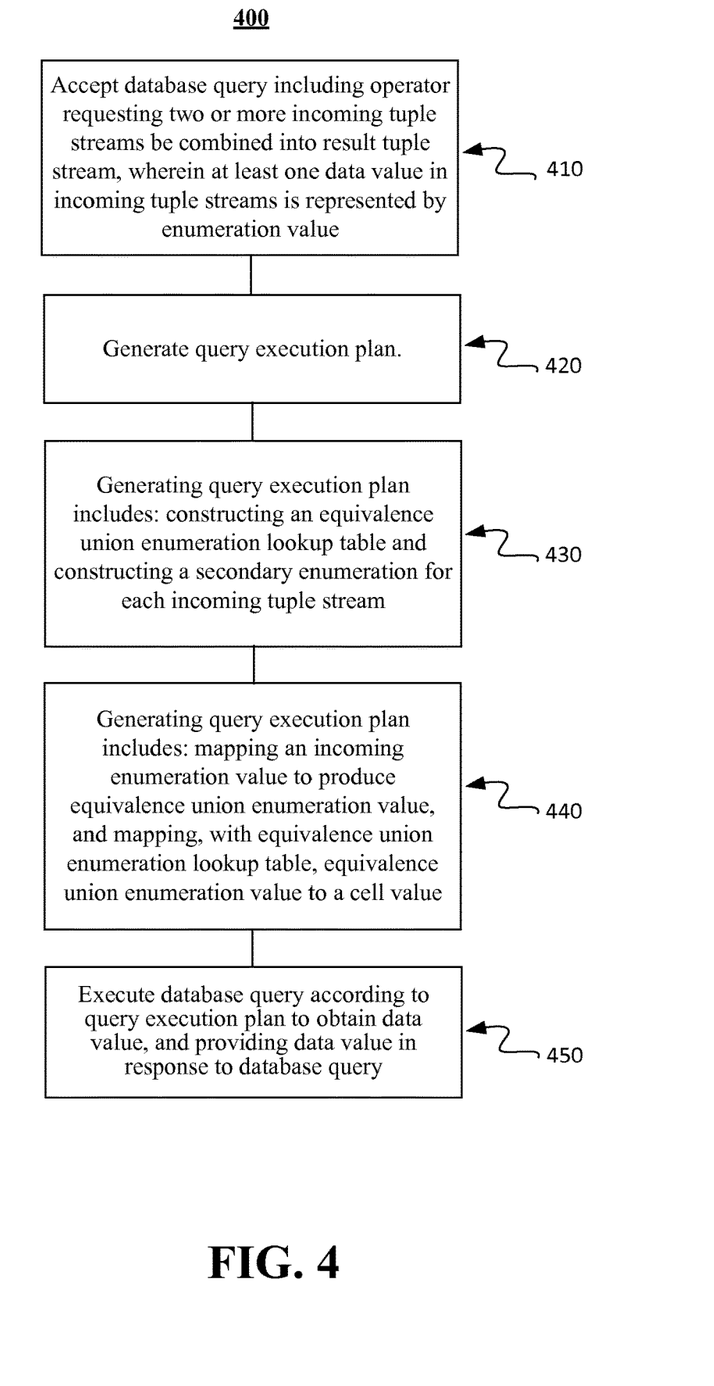
FIG. 4 depicts a process, in accordance with some embodiments.

FIG. 4 depicts a process for querying a table for a data value, in accordance with some example embodiments. At 410, a query for a data value in a table may be received from a remote computing system. The query may include an equivalence union enumeration value (also referred to as an equivalence union enumeration value). At 420, a query execution plan may be generated. At 430, the query execution plan may include selecting a lookup table associated with an output table, wherein the output table is generated using equivalence union enumeration and the lookup table, and wherein each cell value in the lookup table has a different value. At 440, the query execution plan may further include mapping, to a data value, an enumeration value included with the query, wherein the data value is determined by looking up in the lookup table the data value based on the enumeration value. At 450, the query may be executed according to the query execution plan to obtain the data value and the data value may be provided to the remote computing system. The description of FIG. 4 also refers to FIGS. 1A, 1B, 2, and 3.

At 410, a query for a data value in a database may be received from a remote computing system. For example, a computing apparatus such as FIG. 5 at 500 detailed below may receive a query for a data value. The query may include an equivalence union enumeration value referencing an equivalence database or table. The equivalence database may be a temporary or a virtual database in that the equivalence database may include enumeration values for determining the actual data values. In some example embodiments, the equivalence database may include enumeration values and the data value may be included in one of the constituent databases.

The equivalence database may include a first database or table. The first database may include first enumeration values. For example, a first table such as T1 110 in FIG. 1A may include enumeration values such as enumeration values 114 representing actual values T1.Y at 118. In the example of FIG. 1A, table T1 has two columns and more than 6 rows. In the example of FIG. 1A, row 5 of T1 has T1.X value of 10, where T1.X refers to the first column of T1. Row 5 of T1 has T1.Y value of 4, where T1.Y refers to the second column of T1. The T1.Y value may be an enumeration value representing an actual value of "Vermont." Lookup table 117 may include one column representing enumeration values and a second column for the actual values. The actual value such as "Vermont" may be found by selecting the row with the first column value corresponding to the enumeration value. The actual value may be determined as the second column value in the same row as enumeration value. In the foregoing examples, Table T1 and lookup table 117 may organize data in columns, but the data may be organized in rows as well.

The equivalence database may include a second database. The second database may include second enumeration values. For example, a second database such as T2 120 in FIG. 1A may include enumeration values such as enumeration values 124 representing actual values T2.Y at 128.

In some example embodiments, the values in the equivalence database may include equivalence enumeration values for mapping the equivalence database to the actual data values in the first and second tables. In some example embodiments, the actual data values in the equivalence database may be reduced to the different possible of values (no duplicate values) as described with respect to FIG. 1B. In the example of FIG. 2, database 110 and database 120 are unified into equivalence (or virtual) database 210. FIG. 2 also includes unifying database 130 into virtual database 210. Unifying may include determining equivalence union enumeration values as described with respect to FIG. 1B. Using the example of FIGS. 1A, 1B and 2 to illustrate, unifying T1 110 into virtual database 210 using lookup table 145 may produce a equivalence union enumeration value 1 at 214 wherein the 1 value corresponds to New York at 152 and is representative of the enumeration value of 1 in the first row of T1.Y at 110. Continuing the example of FIGS. 1A, 1B, and 2, unifying T2 120 into virtual database 210 may produce an equivalence union enumeration value 5 at 219 wherein the 5 value corresponds to Maine at 154 and is representative of the enumeration value of 2 in T2.Y at 120. Equivalence database 210 may be generated in this way with column 204 containing equivalence union enumeration values and column 202 containing T.X values. In some example embodiments, column 202 may be a concatenation of values from T1.X, followed by T2.X, followed by T3.X. The input databases may be assembled in any other order as well. The equivalence enumeration values may be generated and stored in accordance with the two ways described with respect to FIG. 3.

At 420, the query execution plan may be generated. Generating the query execution plan at 430 may include constructing an equivalence union enumeration lookup table for a result domain of the result tuple stream by taking a set union of incoming tuple domains, wherein each value within that result domain is assigned an enumeration value. Generating the query execution plan may also include constructing a secondary enumeration for each incoming tuple stream, wherein each secondary enumeration maps enumerated values within the incoming tuple stream into secondary ordinal values, and wherein the secondary ordinal values correspond to equivalence union enumeration values. Generating the query execution plan at 440 may also include mapping an incoming enumeration value through the secondary enumeration to produce an equivalence union enumeration value, and/or mapping, with the equivalence union enumeration lookup table, the equivalence union enumeration value to a cell value.

An equivalence union enumeration lookup table may be associated with an output table or output tuple stream. For example, an output tuple stream such as output tuple stream 210 may have equivalence union enumeration values 204 generated from a mapping table associated with each input tuple stream T1, T2, and T3. In the example of FIG. 2, each input tuple stream has a different mapping table. FIG. 3 depicts an example of a mapping table to determine the equivalence union enumeration value from the T3.Y ordinal value (or corresponding T3.Y data value). In the example of FIG. 1A, the three mapping tables of which FIG. 3 is an example for T3, may map the input tuple enumeration values to the equivalence union enumeration values in FIG. 1B at 150.

A query execution plan may further include mapping, to a data value, an equivalence enumeration value included with the query, wherein the data value is determined by looking up in the lookup table the data value based on the enumeration value. The data value may be determined by looking up in a lookup table the data value based on the equivalence enumeration value. For example, the data value corresponding to an equivalence enumeration value of 6 may be determined by looking up equivalence enumeration value 6 in lookup table 145 to determine that the value is New Jersey.

At 450, the query may be executed according to the query execution plan to obtain the data value. In some example embodiments, the actual value such as the T.Y value in FIGS. 1A, and 1B may be determined from an equivalence enumeration value. For example, from equivalence enumeration value 1 in FIG. 2, the corresponding T.Y value may be determined using a lookup table such as lookup table 145 to determine the actual value of New York. In this way, the equivalence union enumeration represents actual values from the input tables such as the first and second tables. The data value may be provided in response to the database query.

Figure 5:
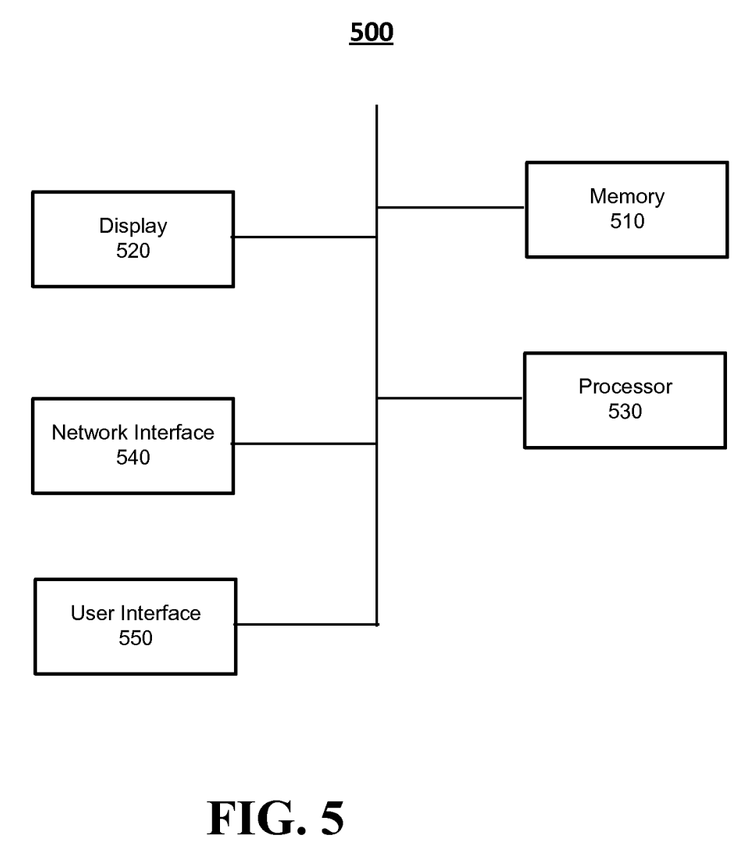
FIG. 5 depicts an apparatus, in accordance with some example embodiments.

FIG. 5 depicts a computing apparatus 500, in accordance with some implementations. Computing apparatus 500 may perform the processes 400. Computing apparatus 500 may include one or more processors such as processor 530 to execute instructions that may implement operations consistent with FIGS. 1A, 1B, 2, 3, and 4. Apparatus 500 may include memory 510 to store executable instructions and/or information such as absence information from a database. Apparatus 500 may include a network interface 540 to a wired network or a wireless network. Wireless networks may include WiFi, WiMax, and cellular networks (2G/3G/4G/5G), and/or any other wireless network. Apparatus 500 may user interface 550 such as a keyboard, mouse, or other interface that may include a touchscreen integrated with display 520.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed:

1. A computer-implemented method comprising:

accepting a database query including an operator requesting two or more incoming tuple streams be combined into a result tuple stream, wherein at least one data value in the incoming tuple streams is represented by an enumeration value;

generating a query execution plan for the query, wherein the generating includes:

constructing an equivalence union enumeration lookup table for a result domain of the result tuple stream by taking a set union of incoming tuple domains, wherein each distinct value within that result domain is assigned an enumeration value;

constructing a secondary enumeration for each incoming tuple stream, wherein each secondary enumeration maps enumerated values within the incoming tuple stream into secondary ordinal values, wherein the secondary ordinal values correspond to equivalence union enumeration values, and wherein each secondary ordinal value corresponds to one data value in the incoming tuple stream;

mapping an incoming enumeration value through the secondary enumeration to produce an equivalence union enumeration value; and mapping, with the equivalence union enumeration lookup table, the equivalence union enumeration value to a cell value using an equivalence union inverse function, wherein the equivalence union inverse function is configured to replace an original value expression of the operator of the query with an equivalence union inverse of an equivalence union enumeration representation generated by the mappings;

executing the query according to the query execution plan to obtain the data value; and providing the data value in response to the database query.

2. The method of claim 1, wherein the operator includes one or more of a SQL language UNION operator, an INTERSECT operator, or an EXCEPT operator.

3. The method of claim 2, wherein value equivalence comparisons required by a SQL language operator are performed by comparing a plurality of equivalence union enumeration values.

4. The method of claim 1, wherein the equivalence union enumeration value is represented by an integer value with a smallest size necessary to enumerate a number of data values in the lookup table.

5. The method of claim 1, wherein a decision to create the query execution plan is made on the basis of estimated costs and benefits.

6. The method of claim 1, wherein the at least one data value in the incoming tuple streams represented by the enumeration value comprises one or more of: a column represented using an enumerated storage, a secondary enumeration over a column represented using an enumerated storage, a value expression encoded using a temporary enumeration, and an equivalence union enumeration from a lower level operator.

7. The method of claim 1, wherein the equivalence union enumeration is assigned enumeration values such that sorting on the cell value and sorting on the enumeration value yield the same ordering.

8. A non-transitory computer readable medium containing executable instructions, that when executed by at least one processor perform operations comprising:

accepting a database query including an operator requesting two or more incoming tuple streams be combined into a result tuple stream, wherein at least one data value in the incoming tuple streams is represented by an enumeration value;

generating a query execution plan for the query, wherein the generating includes:

constructing an equivalence union enumeration lookup table for a result domain of the result tuple stream by taking a set union of incoming tuple domains, wherein each distinct value within that result domain is assigned an enumeration value;

constructing a secondary enumeration for each incoming tuple stream, wherein each secondary enumeration maps enumerated values within the incoming tuple stream into secondary ordinal values, wherein the secondary ordinal values correspond to equivalence union enumeration values, and wherein each secondary ordinal value corresponds to one data value in the incoming tuple stream;

mapping an incoming enumeration value through the secondary enumeration to produce an equivalence union enumeration value; and mapping, with the equivalence union enumeration lookup table, the equivalence union enumeration value to a cell value using an equivalence union inverse function, wherein the equivalence union inverse function is configured to replace an original value expression of the operator of the query with an equivalence union inverse of an equivalence union enumeration representation generated by the mappings;

executing the query according to the query execution plan to obtain the data value; and providing the data value in response to the database query.

9. The non-transitory computer readable medium of claim 8, wherein the operator includes one or more of a SQL language UNION operator, an INTERSECT operator, or an EXCEPT operator.

10. The non-transitory computer readable medium of claim 9, wherein value equivalence comparisons required by a SQL language operator are performed by comparing a plurality of equivalence union enumeration values.

11. The non-transitory computer readable medium of claim 8, wherein the equivalence union enumeration value is represented by an integer value with a smallest size necessary to enumerate a number of data values in the lookup table.

12. The non-transitory computer readable medium of claim 8, wherein a decision to create the query execution plan is made on the basis of estimated costs and benefits.

13. The non-transitory computer readable medium of claim 8, wherein the at least one data value in the incoming tuple streams represented by the enumeration value comprises one or more of: a column represented using an enumerated storage, a secondary enumeration over a column represented using an enumerated storage, a value expression encoded using a temporary enumeration, and an equivalence union enumeration from a lower level operator.

14. The non-transitory computer readable medium of claim 8, wherein the equivalence union enumeration is assigned enumeration values such that sorting on the cell value and sorting on the enumeration value yield the same ordering.

15. A system compromising:

at least one processor; and at least one memory including instructions that when executed by the at least one processor provide operations comprising:

accepting a database query including an operator requesting two or more incoming tuple streams be combined into a result tuple stream, wherein at least one data value in the incoming tuple streams is represented by an enumeration value;

generating a query execution plan for the query, wherein the generating includes:

constructing an equivalence union enumeration lookup table for a result domain of the result tuple stream by taking a set union of incoming tuple domains, wherein each distinct value within that result domain is assigned an enumeration value;

constructing a secondary enumeration for each incoming tuple stream, wherein each secondary enumeration maps enumerated values within the incoming tuple stream into secondary ordinal values, wherein the secondary ordinal values correspond to equivalence union enumeration values, and wherein each secondary ordinal value corresponds to one data value in the incoming tuple stream;

mapping an incoming enumeration value through the secondary enumeration to produce an equivalence union enumeration value; and mapping, with the equivalence union enumeration lookup table, the equivalence union enumeration value to a cell value using an equivalence union inverse function, wherein the equivalence union inverse function is configured to replace an original value expression of the operator of the query with an equivalence union inverse of an equivalence union enumeration representation generated by the mappings;

executing the query according to the query execution plan to obtain the data value; and providing the data value in response to the database query.

16. The system of claim 15, wherein the operator includes one or more of a SQL language UNION operator, an INTERSECT operator, or an EXCEPT operator.

17. The method of claim 16, wherein value equivalence comparisons required by a SQL language operator are performed by comparing a plurality of equivalence union enumeration values.

18. The system of claim 15, wherein the equivalence union enumeration value is represented by an integer value with a smallest size necessary to enumerate a number of data values in the lookup table.

19. The system of claim 15, wherein the at least one data value in the incoming tuple streams represented by the enumeration value comprises one or more of: a column represented using an enumerated storage, a secondary enumeration over a column represented using an enumerated storage, a value expression encoded using a temporary enumeration, and an equivalence union enumeration from a lower level operator.

20. The system of claim 15, wherein the equivalence union enumeration is assigned enumeration values such that sorting on the cell value and sorting on the enumeration value yield the same ordering.

* * * * *